(12) United States Patent
Lawrence et al.

(10) Patent No.: US 7,310,622 B2
(45) Date of Patent: Dec. 18, 2007

(54) REPRESENTING AND MANIPULATING CORRELITHM OBJECTS USING QUANTUM OBJECTS

(75) Inventors: P. Nick Lawrence, Dallas, TX (US); Douglas J. Matzke, Plano, TX (US); Chandler L. Burgess, Dallas, TX (US)

(73) Assignee: Lawrence Technologies, LLC, Dallas, TX (US)

( * ) Notice: Subject to any disclaimer, the term of this patent is extended or adjusted under 35 U.S.C. 154(b) by 528 days.

(21) Appl. No.: 10/634,490

(22) Filed: Aug. 5, 2003

(65) Prior Publication Data

US 2004/0044940 A1 Mar. 4, 2004

Related U.S. Application Data

(60) Provisional application No. 60/403,331, filed on Aug. 13, 2002.

(51) Int. Cl.
*G06F 15/18* (2006.01)

(52) U.S. Cl. .............................. 706/14; 706/12; 706/46

(58) Field of Classification Search ................. 706/14, 706/12, 46; 714/746
See application file for complete search history.

(56) References Cited

U.S. PATENT DOCUMENTS 6,167,391 A * 12/2000 Lawrence ..................... 706/26
6,947,913 B1 * 9/2005 Lawrence ..................... 706/14

FOREIGN PATENT DOCUMENTS

| WO | WO 99/53410 | | 10/1999 |
|---|---|---|---|
| WO | WO 01/67186 | * | 9/2001 |
| WO | WO 01/75512 | | 10/2001 |

OTHER PUBLICATIONS

Nick. P. Lawrence, Correlithm Object Technology, Apr. 30, 2004, Correlithm Publications.*
Matzke, Douglas J. et al, Invariant quantum ensemble metrics, Proc. SPIE vol. 5815 Quantum Information and Computation III; p. 115-126.*
Michael A. Nielsen et al, Quantum Computation and Quantum Information, 2000, University of Cambridge, 4, 5, 7, 14, 71, 72, 73, 81, 279, 587, 588, 589.*
"Correlithm," XP-002111789, *Lawrence Technologies*, on the Internet at www.lt.com/corelth.htm, 1996 (retrieved Jun. 24, 1999), 2 pages.
"Theory of Corobs," XP-002111790, *Lawrence Technologies*, on the Internet at www.lt.com/corobs.htm, 1996 (retrieved Jun. 24, 1999), 3 pages.
PCT International Search Report in International Application No. PCT/US 03/25026, dated Dec. 21, 2004, 7 pages.

(Continued)

*Primary Examiner*—Joseph P Hirl
(74) *Attorney, Agent, or Firm*—Munsch, Hardt, Kopf & Harr P.C.

(57) ABSTRACT

Performing operations using quantum correlithm objects includes establishing real states, where each real state comprises an element of a real space, and encoding the real states as quantum objects representing a correlithm object. The correlithm object is projected to the real space using a measurement basis, and measurement values corresponding to the measurement basis are determined. The projected correlithm object is retrieved according to the measurement values.

50 Claims, 5 Drawing Sheets

OTHER PUBLICATIONS

U.S. Appl. No. 09/938,948, filed Aug. 23, 2001, entitled "Systems And Methods For Generating String Correlithm Objects," 98 total pages.

U.S. Appl. No. 10/081,620, filed Feb. 20, 2002, entitled "System And Method For Identifying Relationships Between Database Records," 120 total pages.

* cited by examiner

REPRESENTING AND MANIPULATING CORRELITHM OBJECTS USING QUANTUM OBJECTS

RELATED APPLICATIONS

This application claims benefit under 35 U.S.C. § 119(e) of U.S. Provisional Application Ser. No. 60/403,331, entitled "SYSTEM AND METHOD FOR SUPPORTING QUANTUM COMPUTATION USING CORRELITHM OBJECTS," filed Aug. 13, 2002.

GOVERNMENT FUNDING

The U.S. Government may have certain rights in this invention as provided for by the terms of Grant Nos. F30602-02-C-0077 and F30602-03-C-0051 awarded by the U.S. Air Force.

TECHNICAL FIELD OF THE INVENTION

This invention relates generally to the field of computational systems and more specifically to representing and manipulating correlithm objects using quantum objects.

BACKGROUND OF THE INVENTION

Quantum computing involves simultaneously representing different states of quantum objects such as electrons. Known techniques for quantum computing involve building a quantum computer molecule by molecule, which may be difficult and time-consuming. Moreover, the various state combinations used during the calculations may be difficult to represent since the spin of individual electrons is often difficult to control. In addition, a quantum computer is typically very sensitive to noise and error. Consequently, known techniques for quantum computing are unsatisfactory in certain situations.

SUMMARY OF THE INVENTION

In accordance with the present invention, disadvantages and problems associated with previous techniques for performing operations using quantum computation or communication may be reduced or eliminated.

According to one embodiment of the present invention, performing operations using quantum correlithm objects includes establishing real states, where each real state comprises an element of a real space, and encoding the real states as quantum objects representing a correlithm object. The correlithm object is projected back to the real space using a measurement basis, and measurement values corresponding to the measurement basis are determined. The projected correlithm object is retrieved according to the measurement values.

Certain embodiments of the invention may provide one or more technical advantages. A technical advantage of one embodiment may be that correlithm objects may be combined with quantum objects to create quantum ensembles. The quantum ensembles may be used to perform operations such as quantum computation or quantum communication. Another technical advantage of one embodiment may be that quantum correlithm objects may be used in place of error correcting techniques for classical algorithms. Yet another technical advantage of one embodiment may be that correlithm objects may have a greater tolerance to noise and error, which may improve the effectiveness of performing operations using quantum correlithm objects.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 7B of the drawings, like numerals being used for like and corresponding parts of the various drawings.

Quantum objects may be used for quantum computation and quantum communication. Quantum objects may comprise high-dimensional real or complex-valued state spaces that include quantum bits ("qubits"), quantum registers ("quregs") of q>0 qubits, and ebits that include quantum registers of q>1 qubits. Correlithm objects may be used to represent data tokens of high-dimensional subspaces, and may be used for noise-immune encoding, decoding, and computation.

In general, there are strong mathematical relationships between quantum objects and correlithm objects, which may be exploited in a number of ways. A quantum encoded correlithim object, or "quantum correlithm object", which may be formed from arrays of quantum objects, survive quantum encoding and measurement. As an example, quantum objects may be operated on for quantum computation or communications purposes. Correlithm objects may be successfully retrieved from the quantum object representation using quantum measurement and correlithm distance metrics. Additionally, the properties of quantum objects may be represented using the properties of correlithm objects.

Standard Metrics

Figure 1:
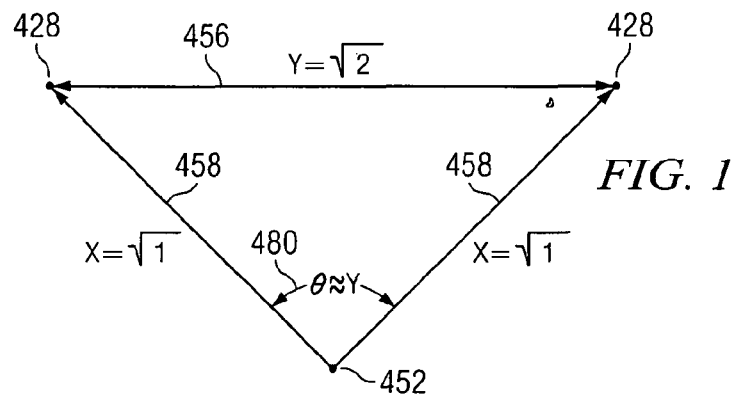
FIG. 1 is a diagram illustrating example random correlithm objects that may be used to form orthonormal vectors.

FIG. 1 is a diagram illustrating example random correlithm objects that may be used to form orthonormal vectors. To aid in the understanding of the figure, standard metrics are described. A standard metric refers to a standardized distance such as a standard distance, a standard radius, a standard corner-corner distance, a standard corner-point distance, or other suitable standardized distance.

Standard Distance

A correlithm object comprises a point of a correlithm object space comprising an n-space, and a random correlithm object comprises a random point of a correlithm object space. According to one embodiment, a correlithm object may represent a point of a generalized m-dimensional sub-space of a particular n-space, where $0 \leq m \leq n$. A generalized sub-space comprises a sub-space for which the participation of each dimension from the n-space has been defined, where participation describes the degree to which a dimension is contained within the sub-space. A dimension may be completely contained within a sub-space, fractionally contained within the sub-space, or completely outside the sub-space. Other embodiments of correlithm object may be used without departing from the scope of this disclosure.

Any suitable distribution of correlithm objects may be used. According to one embodiment, uniformly distributed random correlithm objects may be used.

A correlithm object may have any suitable number of entries. For example, a correlithm object may include at least twenty, thirty, one hundred, one thousand, or ten thousand entries such as between thirty and one hundred entries. According to one embodiment, each entry of a correlithm object represents any suitable number of quantum objects such as quantum bits ("qubits"), quantum registers of q>0 qubits, and ebits that include quantum registers of q>1 qubits. As an example, a correlithm object may represent any suitable number of qubits, where each qubit includes a pair of real or complex numbers. For example, an entry may include one qubit, two qubits, or five qubits. In this document, the term "each" refers to each of at least a subset of the identified items.

Each quantum object may include a pair of real or complex numbers represented in any suitable manner, such as according to a rectangular form or phasor form. An entry may include real numbers, complex numbers, or other suitable values in place of quantum objects. According to a particular embodiment, a correlithm object may represent a collection or ensemble of independent sets of one or more quantum objects, where the quantum objects of one entry are related or entangled but remain independent from the quantum objects of other entries.

Random correlithm objects tend to lie at an approximately standard distance from one another, and the distance between a random correlithm object and a center point approaches an approximately standard radius distance. Vectors formed from the center point to random correlithm objects are approximately orthogonal to one another. In addition, if random correlithm objects lie inside a unit n-cube, the distance between the center point of the n-cube and a random corner of the n-cube approaches a standard radius distance of approximately $$\sqrt{\frac{N}{12}},$$

and the distance between a random correlithm object and a random corner of the n-cube approaches a standard distance of approximately $$\sqrt{\frac{N}{3}},$$

which is twice the standard radius.

Standard Radius

The "standard radius" refers to the distance between the midpoint of a space or distribution and a random point. The midpoint is the average of many random points, and is typically the midpoint of the space. The standard radius is typically shorter than the standard distance by approximately $\sqrt{½}$, so the standard radius for a unit cube with a standard distance of $\sqrt{N/6}$ is approximately $\sqrt{N/12}$, where N represents the number of cells of a correlithm object. The standard radius is statistical, and has a constant standard deviation of approximately $\sqrt{1/60}$ for large N.

Standard Angle

The "random vector" refers to a vector from the midpoint of a space to a random point. The inner product of two random vectors is approximately zero, that is, two random vectors are approximately orthogonal. Accordingly, two random points formed into random vectors may be considered to be orthogonal. Correlithm objects are at standard radius away from a midpoint and are orthogonal, and may be considered to be a standard distance apart.

If the space is symmetric around zero, then the midpoint of the space or distribution is located at zero. Under these conditions, the representation for a point is identical to the representation for a vector, which may facilitate the dual manner of computing for points or vectors without any translation. The standard angle and inner product metric are statistical, and each has a constant standard deviation that is not dependent on N.

Standard Corner-Corner Distance

The "standard corner-corner distance" refers to the standard distance between any two randomly chosen corners of a bounded space. For example, the corners of a unit cube typically have coordinates values that are binary values (0 or 1), and the Cartesian distance, which is equivalent to the square root of the Hamming distance, is approximately the value of $\sqrt{N/2}$. The Cartesian distance metric is statistical, and has a constant standard deviation of approximately 0.35 for large N, which is independent of N.

Standard Corner-Point Distance

The "standard corner-point distance" refers to the standard distance between a randomly chosen corner and a randomly chosen point inside of a bounded space. For example, the standard corner-point distance for a unit cube is approximately the value of $\sqrt{N/3}$, which is approximately twice the standard radius. The standard corner-point distance may be generalized for any space, and may be slightly different depending on the distribution of random points within the space compared to the size of the bounding box. The standard corner-point distance is statistical and has a constant standard deviation that is independent of N.

Normalization with Standard Radius

The standard radius is intrinsic for correlithm object distributions, so the standard radius may be used to normalize the metrics. Normalized metrics are not dependent on N and approximate the square root of a small integer value. For a unit cube, the normalized value for the standard radius is approximately 1, for the standard distance is approximately $\sqrt{2}$, for the standard corner-point distance is approximately $\sqrt{4}$, and for the standard corner-corner distance is approximately $\sqrt{6}$. The normalized values may be generalized for any bounded space, and the standard distance remains at approximately $\sqrt{2}$ due to the Pythagorean theorem.

The normalization yields orthonormal random points. Any standard metric may be used for normalization for different purposes. When related constant standard deviations are normalized, the standard deviations have the form $\sqrt{x/N}$, where x is some small constant value. Therefore as N increases the normalized standard deviations shrinks to 0. For example, for a unit cube, the normalized deviation of standard distance is $\sqrt{7/10N}$.

Referring back to FIG. 1, vectors 458 originate at a center point 452, and each vector 458 is directed at a correlithm object 428. According to one embodiment, each vector 458 represents a quantum state. The quantum states may be orthonormal, that is, have unit lengths and be orthogonal.

As discussed above, randomly selected correlithm objects 428 lie at a normalized standard radius $X=\sqrt{1}$ of approximately a unit length from center point 452 and approximately at an normalized standard distance $Y=\sqrt{2}$ from each other. Moreover, vectors 458 are approximately orthogonal according to the Pythagorean theorem. Accordingly, random correlithm objects 428 may be used to generate a set of orthonormal vectors to represent quantum states.

The number of dimensions of the correlithm objects 428 may be used to control the standard deviation of angle 480. For example, correlithm objects 428 with one hundred entries may have a standard deviation of approximately four degrees, correlithm objects 428 with one thousand entries may have a standard deviation of approximately one degree, and correlithm objects 428 with three thousand entries may have a standard deviation of less than one degree. If orthogonal vectors need to be exactly defined, however, the Gram-Schmidt construction algorithm or other suitable mechanism may be used to generate the exact orthogonal basis states.

Modifications, additions, or omissions may be made to the example without departing from the scope of the invention. For example, the distances illustrated in FIG. 1 have been normalized using the standard radius X. Different distances may be obtained using other normalizing factors. As another example, vectors 428 may have angles 480 other than 90°. For example, if vectors 458 are normalized, angle 480 between vectors 458 may be proportional to the distance between correlithm objects 428, which may be adjusted to construct vectors with a specific phase angle relationship.

Decoding Correlithm Objects from Quantum Objects

Figure 2:
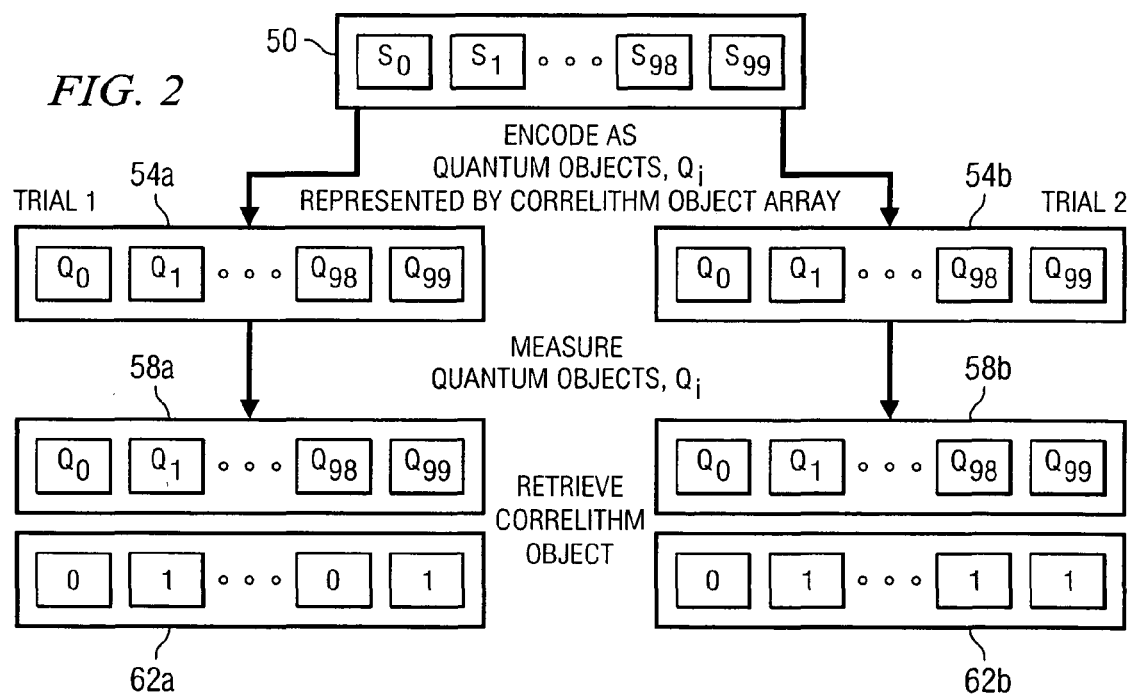
FIG. 2 is a diagram illustrating one embodiment of a method for performing operations using quantum correlithm objects.

FIG. 2 is a diagram illustrating one embodiment of a method for performing operations using quantum correlithm objects. According to the method, real states are encoded as quantum objects represented by correlithm objects. The quantum objects are measured to project the correlithm objects to real space, and the measurements are analyzed to retrieve the projected correlithm objects in real space. According to one embodiment, intermediate operations may be performed prior to measurement.

According to the illustrated embodiment, the method begins with a random distribution of real states. The real states are represented by a real array S 50 that includes entries $S_i$ representing real states. The real states are encoded as random quantum objects $Q_i$, which are represented by the entries of a correlithm object array 54a-b. The same random real states may be encoded at one or more trials to yield one or more quantum correlithm object arrays 54a-b. A correlithm object array 54a-b includes entries, where each entry represents one or more quantum objects. The quantum objects $Q_i$ are measured to yield end state arrays, which are represented by correlithm object arrays 58a-b. The correlithm object arrays are analyzed to retrieve the projected correlithm objects in real space, represented by binary answer correlithm object arrays 62a-b.

Modifications, additions, or omissions may be made to the method without departing from the scope of the invention. Additionally, steps may be performed in any suitable order without departing from the scope of the invention. As an example, one or more optional quantum operations may be applied to each of the quantum correlithm object cells after encoding and prior to decoding. Example quantum operations may comprise a phase gate, a not gate, a Hadamard gate, or other operation. According to another embodiment, noise may be injected into the quantum object states. According to yet another embodiment, no operations may be applied to quantum object states between encoding and decoding. According to yet another embodiment, quantum objects may comprise quantum bits, quantum registers, or ebits.

Example Systems

Computing System

Figure 3:
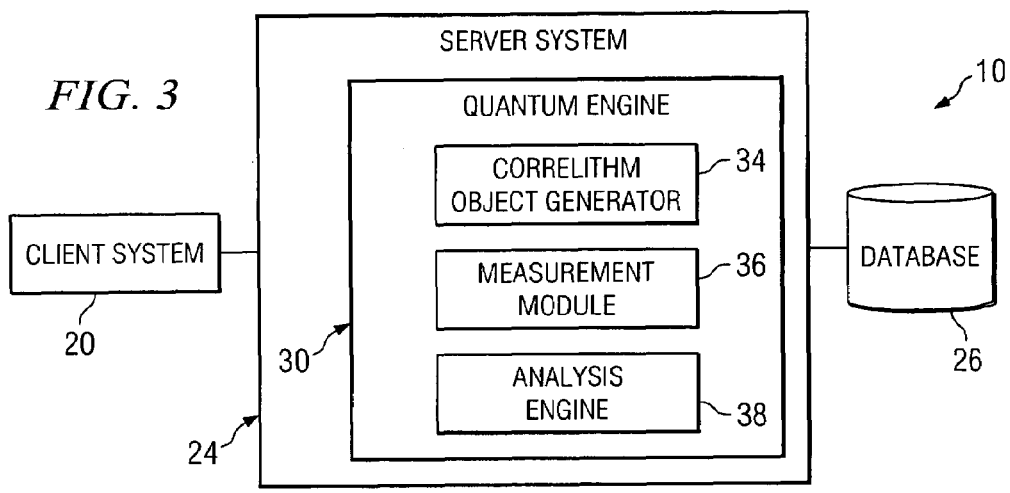
FIG. 3 is a block diagram illustrating one embodiment of a computing system for performing operations using quantum correlithm objects.

FIG. 3 is a block diagram illustrating one embodiment of a computing system 10 for performing operations using quantum correlithm objects. According to one aspect of operation, computing system 10 may be used to generate and manipulate correlithm objects to perform operations using quantum correlithm objects. For example, computing system 10 may be used to map correlithm objects of a real or complex space to quantum states, perform a measurement of the quantum states to project the correlithm objects to real space, and analyze the measurements to retrieve the projected correlithm objects in real space.

According to the illustrated embodiment, computing system 10 includes a client system 20, a server system 24, and a database 26 or memory coupled as shown in FIG. 3. According to one embodiment, client system 20 allows a user to communicate with server system 24 to perform operations using quantum correlithm objects. Database 26 or memory stores data used by server system 24.

Server system 24 manages applications that perform operations using quantum correlithm objects, such as a quantum engine 30. Quantum engine 30 may include any suitable modules, such as a correlithm object generator 34, a measurement module 36, and an analysis engine 38. Server system 24, however, may include any general purpose or custom modules suitable for performing operations using quantum correlithm objects.

According to one embodiment, correlithm object generator 34 generates random correlithm objects. Random correlithm objects may be used to represent standard basis states and to form superposition states, which may be used to represent an element that is simultaneously in both standard basis states. The standard and dual basis states may be used to represent quantum superposition of quantum states. The quantum states may be translated back into a classical state by a measurement process.

Correlithm object generator 34 may be used to generate simulated random correlithm objects by randomly assigning values to simulated entities. Correlithm object generator 34 may be used to generate physically-encoded random correlithm objects by providing instructions to a source that generates physically-encoded random correlithm objects. As an example, correlithm object generator 34 may provide instructions to the system.

Correlithm object generator 34 may be used to generate random correlithm objects according to any suitable manner. According to one embodiment, random correlithm objects may be generated by randomly assigning values such as real or complex numbers to, for example, characteristics of entities such as subatomic particles, for example, electrons or photons. Characteristics may comprise, for example, a phase, color, spin, or charm of an electron or a phase of a photon.

The real or complex numbers may be randomly generated using any suitable method. As an example, if complex numbers are expressed in rectangular form with variables a and b, values may be randomly selected for a and b. As another example, if complex numbers are expressed in phasor form with magnitude r and phase angle $\theta$, magnitude r may be set equal to a constant such as one and values between 0 and $2\pi$ may be randomly selected for phase angle $\theta$. As yet another example, if complex numbers are expressed in phasor form, values between zero and one inclusive may be randomly selected for magnitude r and values between 0 and $2\pi$ may be randomly selected for phase angle $\theta$.

Measurement module 36 is used to perform a measurement of the quantum states to project the correlithm objects to real space. As an example, measurement module 36 may be used to generate simulated measurements of simulated entities. As another example, measurement module 36 may be used to measure physically-encoded correlithm objects by providing instructions to a detector that measures physically-encoded correlithm objects. As an example, measurement module 36 may provide instructions to the system. Analysis engine 38 is used to analyze the measurements in order to retrieve the correlithm objects projected in real space.

Client system 20 and server system 24 may each operate on one or more computers and may include appropriate input devices, output devices, mass storage media, processors, memory, or other components for receiving, processing, storing, and communicating information according to the operation of computing system 10. As used in this document, the term "computer" refers to any suitable device operable to accept input, process the input according to predefined rules, and produce output, for example, a personal computer, work station, network computer, wireless telephone, personal digital assistant, one or more microprocessors within these or other devices, or any other suitable processing device.

Client system 20 and server system 24 may be integrated or separated according to particular needs. For example, the present invention contemplates the functions of both client system 20 and server system 24 being provided using a single computer system, for example, a single personal computer. If client system 20 and server system 24 are separate, client system 20 may be coupled to server system 24 using one or more local area networks (LANs), metropolitan area networks (MANs), wide area networks (WANs), a global computer network such as the Internet, or any other appropriate wireline, wireless, or other links.

A database 26 stores data that may be used by server system 24. Database 26 may be local to or remote from server system 24, and may be coupled to server system 24 using one or more local area networks (LANs), metropolitan area networks (MANs), wide area networks (WANs), a global computer network such as the Internet, or any other appropriate wireline, wireless, or other links.

Modifications, additions, or omissions may be made to computing system 10 without departing from the scope of the invention. Moreover, the operations of computing system 10 may be performed by more or fewer modules. For example, the operations of measurement module 36 and analysis engine 38 may be performed by one module, or the operations of analysis engine 38 may be performed by more than one module. Additionally, functions may be performed using any suitable logic comprising software, hardware, other logic, or any suitable combination of the preceding.

Computing system 10 may be used to perform operations using quantum correlithm objects. One embodiment of a method for performing operations using quantum correlithm objects is described with reference to FIG. 2, and one embodiment of a system 100 for performing operations using quantum correlithm objects is described with reference to FIG. 3. Examples of random correlithm objects used to perform operations using quantum correlithm objects are described with reference to FIGS. 4 through 7B.

Matched Filter System

Figure 4:
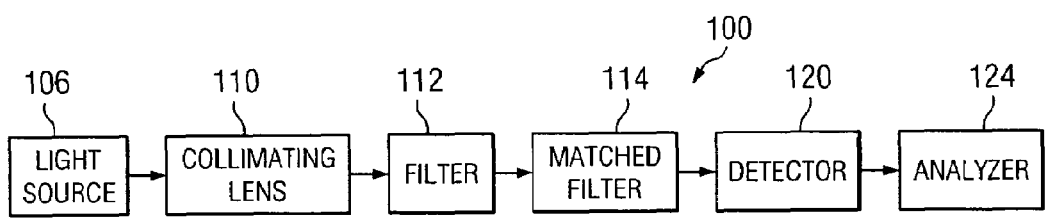
FIG. 4 is a block diagram illustrating one embodiment of a system for performing operations using quantum correlithm objects.

FIG. 4 is a block diagram illustrating one embodiment of a system 100 for performing operations using quantum correlithm objects. System 100 maps correlithm objects of real or complex vector spaces to quantum states, performs a measurement of the quantum states to project the correlithm objects to real space, and analyzes the measurements to retrieve the projected correlithm objects in real space. Quantum or other physical systems may provide for fast correlithm object computing.

According to the illustrated embodiment, system 100 includes a light source 106, a collimating lens 110, a filter 112, a matched filter 114, a detector 120, and an analyzer 124 configured as illustrated in FIG. 4. According to the embodiment, light source 106 generates photons, which are used as the entities upon which a random correlithm object configuration is imposed. Light source 106 may generate, for example, a beam of coherent light having substantially the same coherent phase.

Collimating lens 110 spreads the light to yield a broader beam that still has an identical phase. Filter 112 filters the light. Filter 112 may have regions of varying optical thickness, where each region may alter the phase of portions of the beam to different degrees. The regions may be arranged such that the phases of the photons are substantially random. As a result, after passing through filter 112, the beam may include photons that are statistically at a uniform phase. Filter 112 may comprise, for example, a lens. Filter 112 may, however, comprise any suitable material or device configured to produce photons having substantially random distribution of phase.

Matched filter 114 comprises a filter that is matched with filter 112 in order to generate a specific output beam for a given input beam filtered through filter 112. Detector 112 detects the beam received from matched filter 114. Detector 120 measures the photons upon which random correlithm objects have been imposed to project the correlithm objects to real space, and sends the measurements to analyzer 124.

Analyzer 124 analyzes the measurements to retrieve the projected correlithm objects. Analyzer 124 compares the measurements of the physically-encoded beam with values predicted for the beam to retrieve the projected correlithm objects. According to one embodiment, a closer match yields a greater intensity of light.

Modifications, additions, or omissions may be made to the system without departing from the scope of the invention. For example, collimating lens 110 may be omitted. Moreover, the operations of the system may be performed by more or fewer modules. For example, the operations of detector 120 and analyzer 124 may be performed by one module, or the operations of analyzer 124 may be performed by more than one module. Additionally, functions may be performed using any suitable logic comprising software, hardware, other logic, or any suitable combination of the preceding.

Furthermore, example embodiments may be applied to other suitable physical objects of a physical system. A physical object refers to an object that may be described by a state space. Examples of physical objects may include DNA molecules or chemical compounds. Examples of physical systems may include quantum, photonic, electronic, magnetic, chemical, molecular, nanotechnical, biological, DNA-related, neurological systems without departing from the scope of this invention. A physically-encoded correlithm object may be formed from arrays of physical objects.

Correlithm Objects on Quantum Objects

Encoding Correlithm Objects on Quantum Objects

Figure 5A:
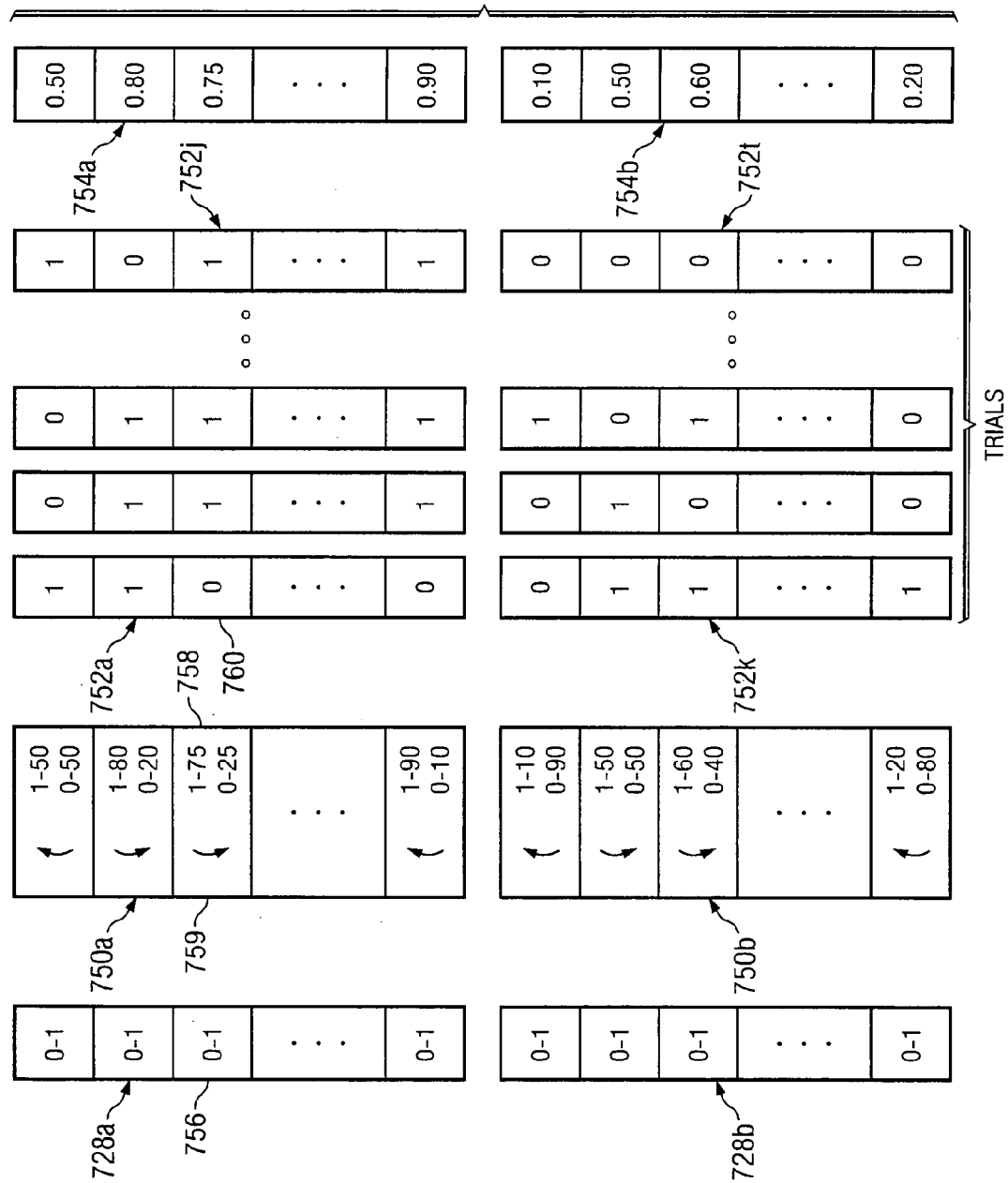
FIGS. 5A and 5B are diagrams illustrating example projections between quantum states and correlithm object space.
Figure 5B:
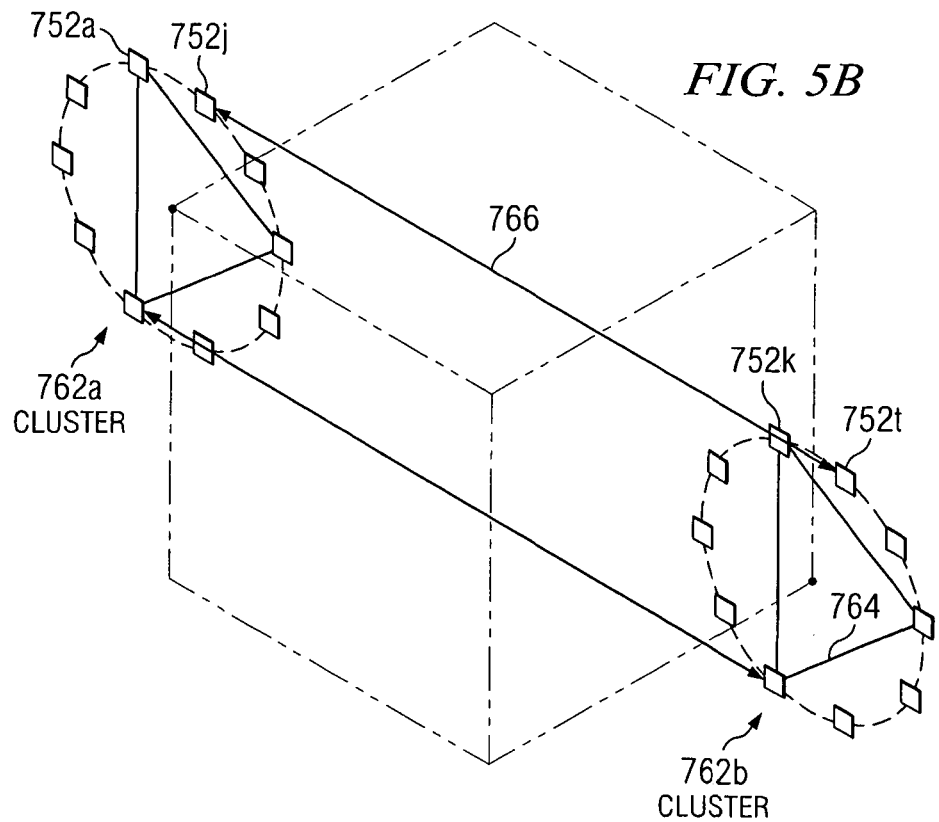

FIGS. 5A and 5B are diagrams illustrating example projections between quantum states and correlithm object space. In particular, FIG. 5A illustrates the transformation of a random correlithm object 728a-b into a quantum representation 750a-b of correlithm object 728a-b, projections 752a-t of quantum representation 750a-b back into correlithm object space, and a correlithm object 754a-b representing the average of projections 752a-t. FIG. 5B illustrates the positioning of projections 752a-t in correlithm object space.

According to one embodiment, correlithm objects may be encoded on quantum objects. According to the embodiment, a correlithm object may comprise an array of unrelated and not entangled, uniformly distributed randomly initialized quantum objects of the same size having N cells and q qubits. Mapping a correlithm object into a quantum space involves initializing the quantum objects to a uniformly distributed starting state or a starting state having any other suitable distribution.

According to the embodiment, the state of each qubit is equivalent to two complex numbers {a,b} that satisfy the unitarity constraint $a^2+b^2=1$. Due to the unitarity constraint, the standard radius for arrays of any type of quantum objects is $\sqrt{N}$. In contrast, in a typical correlithm object system with a unit cube, the side length of the bounding box is 1, resulting in major diagonal to be $\sqrt{N}$. A distance metric may be computed using these states when modeling qubits, but the state and distance metric is not directly observable in real qubits.

Referring to FIG. 5A, a random correlithm object 728a includes entries 756, where each entry 756 has a random real value between 0.0 and 1.0 inclusive or equivalent. Correlithm object 728a may be represented as a quantum representation 750a that includes entries 758. The value of an entry 756 of correlithm object 728a is mapped to a phase angle 759, such as an angle between 0 and $2\pi$, and is represented as a quantum object. Each entry 758 is also associated with probabilities associated with the states of a quantum elemental particle. According to one embodiment, quantum representation 750a may be generated by filter 112 of system 100 described in more detail with reference to FIG. 4. Quantum objects may comprise quantum bits, quantum registers, or ebits.

Projections 752a-j may be generated according to the probabilities of quantum representation 750a. A projection 752a-j describes many trials of projections of a quantum state from real or complex vector space into a binary valued real or complex number space, and represents a binary correlithm object in a real or complex number space. Each trial projection 752a-j includes entries 760 having a value of either zero or one. The value of an entry 760 is determined according to the probabilities of a corresponding entry 758. For example, first entries 760 of projections 752a-j have a value of one in 50 percent of the cases and a value of zero in the other 50 percent of the cases. The last entries 760 of projections 752a-j have a value of one in 90 percent of cases and a value of zero in 10 percent of the cases. According to one embodiment, projections 752a-j may be generated by matched filter 114 of system 100 of FIG. 4.

In addition, a correlithm object 754a that represents the average values from projections 752a-j may be generated. Because projections 752a-j have values determined using the probabilities of quantum representation 750a, correlithm object 754a may have real values representing the probabilities of quantum representation 750a, which may be regarded as equivalent to averaging many trials.

Referring to FIG. 5B, a cluster 762a-b of correlithm objects may be located in real space. Projections 752a-t associated with the correlithm objects correlithm objects 728a-b. For example, many trials of projections 752a-t associated with a particular correlithm object 728a-b tend to form a cluster 762a-b of answer correlithm objects in the real space. Within each cluster 762a-b, projections 752a-t are separated from one another by a standard distance 764, and a projection 752a-t of one cluster 762a-b is separated from a projection 752a-t of another cluster 762a-b by a standard distance 766. This may be regarded as an example of an average that is not the midpoint of the space.

According to one embodiment, standard distance 766 represents the standard binary distance, which may be determined using the formula:

$$\text{Distance} = \sqrt{\frac{N}{2}}.$$

According to the embodiment, standard distance 764 between projections 752a-t of a cluster 762a-b may be smaller than the standard distance 766 between projections of different clusters 762a-b, depending on the entries of correlithm objects 728a-b. For example, if each entry 756 of correlithm objects 728a-b includes a complex number, standard distance 764 is approximately 0.707 of the standard distance 766. As another example, if each entry 756 includes a quantum object, example standard distances 764 may be given by TABLE 1, where the values are normalized as a percentage of standard distance.

TABLE 1

| Quantum Object | State After Measurement | Answer Distance |
|---|---|---|
| Qubit | 0.55 | 0.707 |
| Qureg, q = 1 | 0.55 | 0.707 |
| Qureg, q = 2 | 0.675 | 0.707 |
| Qureg, q = 3 | 0.75 | 0.707 |
| Qureg, q = 4 | 0.83 | 0.707 |
| Qureg, q = 5 | 0.86 | 0.707 |
| Qureg, q = 6 | 0.89 | 0.707 |
| Ebit, q = 2 | 0.5 | 0.707 |
| Ebit, q = 3 | 0.5 | 0.707 |

According to one embodiment, the results presented in TABLE 1 are for random minor phase. The results for non-random minor phase may be slightly higher.

Projections 752a-t associated with the same correlithm object 728a-b may act like noisy versions of the same point in real space. If an entry has probabilities that strongly favor one value over another, the favored value occurs more often in projections 752a-t. If an entry has probabilities that tend to equally favor both values, the values may occur more evenly in projections 752a-t. In effect, the more favored values tend to appear in more projections 752a-t, so they act like constants. In contrast, the equally favored values act like noise, without strongly favoring one value or the other.

According to one embodiment, real point correlithm objects 728a-b may be transformed into quantum representations and then mapped back into real-valued binary projections 752a-t that maintain the characteristics of correlithm objects 728a-b. The relationships between the binary points may be used to represent an associative or content addressable memory. Similarly, the binary projections 752a-t may be mapped into points of an N-cube at a standard radius to create a correlithm object having real values between 0.0 and 1.0 inclusive. These correlithm objects may then be used to represent phase coherency and represent the average ensemble response from quantum computing.

Taken together, FIGS. 5A and 5B show that correlithm objects of correlithm object space may be represented as random phase angles of a quantum system. The quantum representation of a correlithm object may then be projected back into correlithm object real space, and the projections maintain the identifying characteristics of the original correlithm objects with possibly some noise injected. The starting correlithm objects may be identified from each other after the process.

Modifications, additions, or omissions may be made to the example without departing from the scope of the invention. For example, any suitable probabilities may be used for quantum representations 750a-b, and any suitable number of projections 752a-t may be generated for each correlithm object 728a-b. Also, the arrangement of projections 752a-t of FIG. 5B is for illustrative purposes only. As another example, quantum operations may be performed before measurement.

The following sections describe how to encode correlithm objects in quantum objects such as qubits, quantum registers, and ebits.

Qubits: Random Phase q=1

According to one embodiment, a randomly chosen point within an array of unrelated qubits may comprise a uniform phase distribution of qubits. The distribution may have any suitable phase range such as a full phase range of 0 to 360 degrees, which may be represented as a range of −180 to +180 degrees. The normalized standard distance for an array of randomly initialized qubits is approximately $\sqrt{2}$.

Qureg: Random Phase q=>1

According to one embodiment, each element of an array may comprise a quantum register that includes one or more randomly generated qubits, where q>=1. The state of the quantum register of each cell may comprise the tensor product of each child qubit, which may allow the state to be separable. The quantum register state may be generated by generating random complex numbers and applying the unitarity constraint. The states, however, might not have a physical meaning. Each quantum register state may be modeled with an array of $s=2^q$ complex numbers $\{a_1, a_2, \ldots a_s\}$ that satisfy the unitarity constraint $a_1^2 + a_2^2 \ldots + a_s^2 = 1$. The normalized standard distance for an array of randomly initialized quregs is approximately $\sqrt{2}$.

Ebits: Random Phase q=>2

According to one embodiment, each element of an array may comprise a quantum register of two or more qubits that are initialized as an ebit, that is, inseparable qubits. The ebit may be initialized to a major phase angle similar to a qubit state to yield a weakly entangled state, and the bell states and the phase may be randomly selected. The normalized standard distance for an array of randomly initialized ebits is approximately $\sqrt{2}$. Measurement of qubits of the ebits may be spatially separated.

Standard Distance for Quantum Objects

As discussed, ensembles of quantum objects may have the same normalized standard distance of $\sqrt{2}$ since the arrays of quantum objects satisfy the unitarity constraint, which scales with the same rate as the Cartesian distance metric used by correlithm object theory. The standard distance is $\sqrt{2N}$, which becomes $\sqrt{2N}/\sqrt{N}=\sqrt{2}$ when normalized by the standard radius of $\sqrt{N}$. Accordingly, randomly chosen correlithm objects encoded in quantum objects are typically separated by a standard distance and are orthogonal, and quantum correlithm objects normalized by standard radius are naturally orthonormal.

Standard Deviation

Most standardized distances are statistical, so the standard deviation for arrays of quantum objects is related to the total number of qubits N*q. Generally, the standard deviation is a constant, but due to the number of qubits in each cell and unitarity constraint, the standard deviation may be efficiently expressed as approximately $(\sqrt{1/2})^{q+1}$, which is a constant independent of N. For example, the standard deviation of standard distance is $(\sqrt{1/2})^2=0.5$ for q=1, $(\sqrt{1/2})^3=0.35$ for q=2, $(\sqrt{1/2})^4=0.25$ for q=3, etc. The standard deviation may apply to any suitable quantum object.

Quantum Properties on Correlithm Objects

Correlithm Object Representation of Orthonormal Bases

Figure 6A:
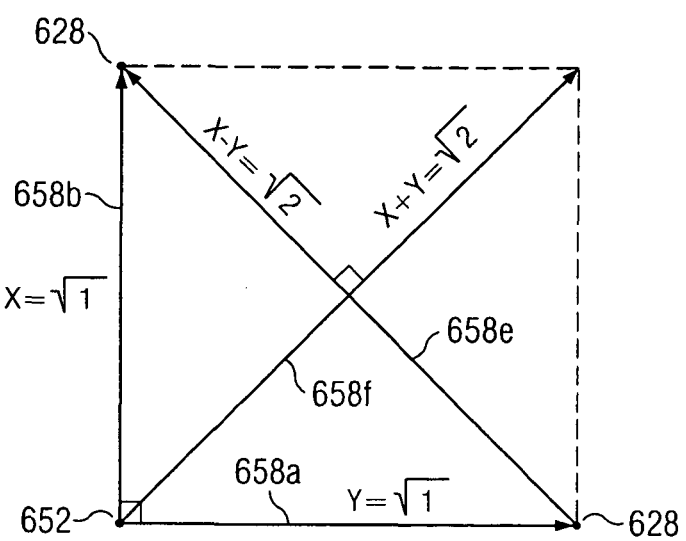
FIGS. 6A and 6B are diagrams illustrating example orthogonal bases for representing quantum states using correlithm objects.
Figure 6B:
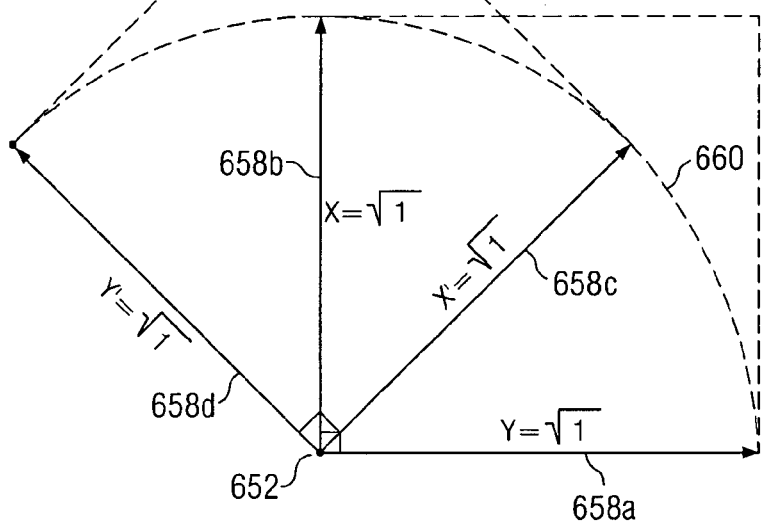

FIGS. 6A and 6B are diagrams illustrating example orthogonal bases for representing quantum states using correlithm objects. In particular, FIGS. 6A and 6B illustrate example standard basis states and dual basis states. Referring to FIG. 6A, standard basis states 658a-b, represented by x and y, initiate from a center point 652 and terminate at random correlithm objects 628. As described above, standard basis states 658a-b may be approximately orthonormal. Dual basis states 658e-f used for quantum computing may be created by summing the standard basis vectors. Dual basis states 658e-f may be renormalized by dividing by $\sqrt{2}$. X correlithm object states when added may be renormalized by dividing by $\sqrt{x}$, for example, three correlithm object states may be renormalized by dividing by $\sqrt{x}$.

Referring to FIG. 6B, dual bases states 658c-d and standard bases states 658a-b may be centered at the same origin point 652 and define a unit sphere 660. Dual bases states 658c-d may be rotated 45° from the standard bases states 658a-b. Vectors 658 may be used to define circular bases according to equations:

$$x'' = \frac{x + iy}{\sqrt{2}}$$

$$y'' = \frac{x - iy}{\sqrt{2}}$$

where the angle for y is in an orthogonal plane other than the plane formed by vectors 658.

Tensor Product of Orthonormal Correlithm Objects

The standard and dual bases may be used to generate a tensor product of correlithm object state vectors, which creates a larger space having a larger number of orthonormal correlithm object basis vectors. If one space Q has m correlithm object basis vectors and another space R has n correlithm object basis vectors, the tensor product Q⊗R has m*n correlithm object basis vectors. The resulting basis vectors are approximately orthogonal and approximately a standard distance apart. The standard basis vectors of the tensor product are enumerated, combinations of the standard correlithm object basis vectors from the original spaces, and the dual basis vectors of the tensor product are enumerated combinations of the dual basis vectors from the original spaces. A tensor operation may comprise any suitable operation operable to generate a tensor product. Examples of tensor operations may include concatenation or multiplication of correlithm object cells or other suitable linear operation that produces random values from random values.

Modifications, additions, or omissions may be made to the examples without departing from the scope of the invention. For example, any suitable number of bases having any suitable angle between one another may be used. As another example, basis vectors may also be combined by concatenating the basis vectors. This creates a set of nearly orthogonal vectors in a new larger space, where the standard radius of the larger space is proportional to $\sqrt{n+m}$.

Tensor Product and String Correlithm Objects

Figure 7:
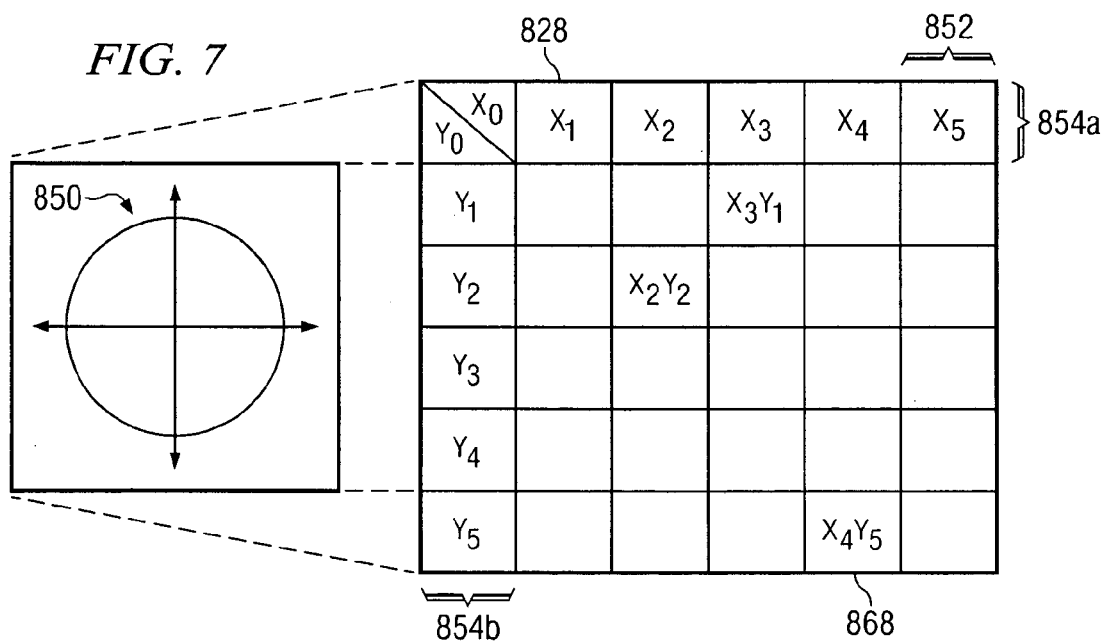
FIG. 7 is a diagram illustrating an example mechanism for mapping a complex number space into a correlithm object space.

FIG. 7 is a diagram illustrating an example mechanism for mapping a complex number space into a correlithm object space. FIG. 7 represents a mapping of a complex vector space 850 to a correlithm object space 852 using string correlithm objects 854a-b. A complex vector space 850 may represent any suitable space such as a Hilbert space, which treats quantum states as a collection of complex numbers. Each complex number is represented as a vector having an angle between 0 and $2\pi$. Each complex number also has a magnitude of one, which may be achieved by placing the vector on the unit sphere.

A geometry, such as space 850, may be embedded into correlithm object space 852 according to any suitable mechanism. For example, complex vector space 850 may be embedded in correlithm object space 852 using one or more string correlithm objects 854a-b. A string correlithm object 854a-b represents a sequence of two or more correlithm objects 828 in which adjacent correlithm objects 828 of the sequence are significantly closer together than the standard distance. The significance of the distance between adjacent correlithm objects 828 may be determined with reference to the standard deviation. For example, distances within one standard deviation of standard distance may be treated as insignificant, and distances falling outside of one standard deviation of standard distance may be treated as significant.

Each string correlithm object 854a-b may represent or otherwise be mapped onto an axis of correlithm object space 852. To represent a point of correlithm object space 852, the position of the point may be mapped onto each of the axes of correlithm object space 852. Correlithm objects 828 of string correlithm object 854a-b may be used to identify the location of the point along an axis. For example, point 868 may be mapped onto one axis by determining that correlithm object $X_4$ is associated with point 868, and may be mapped onto the other axis by determining that correlithm object $Y_5$ is associated with point 868. By identifying correlithm object 828 along each axis, the location of a point in space 852 may be defined.

A multi-dimensional correlithm object may be generated by aggregating or otherwise combining correlithm objects 828. For example, point 868 may be represented by a correlithm object formed by concatenating correlithm object $X_4$ and correlithm object $Y_5$. As a tensor product of non-string correlithm object state vectors may be used to create a cardinal space, a tensor product of string correlithm object state vectors may be used to create an ordinal space.

Point 868 of space 852 may or may not be projected exactly onto a correlithm object 828 along an axis. If not, any suitable action may be used to project the point. For example, the closest correlithm object 828 may be identified. An interpolation using the two closest correlithm objects 828 along an axis may be performed to generate a more precise correlithm object associated with point 868.

Complex vector space 850 may be embedded in correlithm object space 852 such that correlithm object space 852 may represent complex vector space 850. Quantum computing may be represented in Hilbert space, which is a complex vector space. Because quantum computing may be represented using complex vector space 850 and complex vector space 850 may be represented in correlithm object space 852, quantum computing may be represented using correlithm object space 852.

Modifications, additions, or omissions may be made to the example of FIG. 7 without departing from the scope of the invention. For example, complex vector space 850 and correlithm object spaces 852, 856 are illustrated as having two dimensions each. Any suitable number of dimensions may be used in spaces 850, 852, 856. As a particular example, each dimension of complex vector space 852 may be associated with a string correlithm object 854a-b in correlithm object space 852 or a vector 858a-b in correlithm object space 856. Also, other mechanisms may be used to embed a complex vector space into correlithm object space.

Certain embodiments of the invention may provide one or more technical advantages. A technical advantage of one embodiment may be that correlithm objects may be combined with quantum objects to create quantum ensembles. The quantum ensembles may be used to perform operations such as quantum computation or quantum communication. Another technical advantage of one embodiment may be that quantum correlithm objects may be used instead of other error correcting techniques for classical algorithms. Yet another technical advantage of one embodiment may be that correlithm objects may have a greater tolerance to noise and error, which may improve the effectiveness of performing operations using quantum correlithm objects. Yet another technical advantage of one embodiment may be that the tensor product may be used for noise immune data fusion applications.

Although an embodiment of the invention and its advantages are described in detail, a person skilled in the art could make various alterations, additions, and omissions without departing from the spirit and scope of the present invention as defined by the appended claims.

What is claimed is:

1. A method for performing operations using quantum correlithm objects, comprising:
   receiving input associated with a plurality of real states;
   establishing the plurality of real states from the input, each real state comprising an element of a real space;
   encoding the real states as a plurality of quantum objects, the quantum objects representing a correlithm object;
   projecting the correlithm object to the real space using a measurement basis determining a plurality of measurement values corresponding to the measurement basis;
   retrieving the projected correlithm object according to the measurement values; and
   providing output indicating the projected correlithm object.

2. The method of claim 1, wherein a quantum object of the plurality of quantum objects comprises an object selected from a group consisting of a quantum bit, a quantum register, and an ebit.

3. The method of claim 1, wherein encoding the real states as the quantum objects comprises assigning a plurality of values to the real states.

4. The method of claim 1, wherein encoding the real states as the quantum objects comprises adjusting a characteristic of a plurality of subatomic particles according to a distribution, each subatomic particle corresponding to a real state.

5. The method of claim 1, wherein:
each quantum object is associated with a probability; and
the measurement values are determined in accordance with the probabilities.

6. The method of claim 1, further comprising performing an intermediate operation prior to determining the plurality of measurement values corresponding to the measurement basis.

7. The method of claim 1, wherein retrieving the projected correlithm object according to the measurement values comprises:
establishing a plurality of predicted values corresponding to the measurement basis;
comparing the measurement values with the predicted values using a metric; and
retrieving the projected correlithm object in accordance with the comparison.

8. A system for performing operations using quantum correlithm objects, comprising:
a source operable to establish a plurality of real states, each real state comprising an element of a real space;
a first filter operable to encode the real states as a plurality of quantum objects, the quantum objects representing a correlithm object;
a second filter operable to project the correlithm object to the real space using a measurement basis, the second filter matched with the first filter; and
an analyzer operable to:
determine a plurality of measurement values corresponding to the measurement basis; and
retrieve the projected correlithm object according to the measurement values.

9. The system of claim 8, wherein a quantum object of the plurality of quantum objects comprises an object selected from a group consisting of a quantum bit, a quantum register, and an ebit.

10. The system of claim 8, wherein the first filter is operable to encode the real states as the quantum objects by assigning a plurality of values to the real states.

11. The system of claim 8, wherein the first filter is operable to encode the real states as the quantum objects by adjusting a characteristic of a plurality of subatomic particles according to a distribution, each subatomic particle corresponding to a real state.

12. The system of claim 8, wherein:
each quantum object is associated with a probability; and
the measurement values are determined in accordance with the probabilities.

13. The system of claim 8, wherein an intermediate operation is performed prior to determining the plurality of measurement values corresponding to the measurement basis.

14. The system of claim 8, wherein the analyzer is operable to retrieve the projected correlithm object according to the measurement values by:
establishing a plurality of predicted values corresponding to the measurement basis;
comparing the measurement values with the predicted values using a metric; and
retrieving the projected correlithm object in accordance with the comparison.

15. A computing system for performing operations using quantum correlithm objects, comprising:
a database operable to store data; and
a server system coupled to the database operable to:
establish a plurality of real states, each real state comprising an element of a real space;
encode the real states as a plurality of quantum objects, the quantum objects representing a correlithm object;
project the correlithm object to the real space using a measurement basis;
determine a plurality of measurement values corresponding to the measurement basis; and
retrieve the projected correlithm object according to the measurement values.

16. The computing system of claim 15, wherein a quantum object of the plurality of quantum objects comprises an object selected from a group consisting of a quantum bit, a quantum register, and an ebit.

17. The computing system of claim 15, wherein the server system is operable to encode the real states as the quantum objects by assigning a plurality of values to the real states.

18. The computing system of claim 15, wherein the server system is operable to encode the real states as the quantum objects by adjusting a characteristic of a plurality of subatomic particles according to a distribution, each subatomic particle corresponding to a real state.

19. The computing system of claim 15, wherein:
each quantum object is associated with a probability; and
the measurement values are determined in accordance with the probabilities.

20. The computing system of claim 15, wherein the server system is operable to perform an intermediate operation prior to determining the plurality of measurement values corresponding to the measurement basis.

21. The computing system of claim 15, wherein the server system is operable to retrieve the projected correlithm object according to the measurement values by:
establishing a plurality of predicted values corresponding to the measurement basis;
comparing the measurement values with the predicted values using a metric; and
retrieving the projected correlithm object in accordance with the comparison.

22. Logic for performing operations using quantum correlithm objects, the logic encoded in a computer-readable storage medium and operable to:
receive input associated with a plurality of real states;
establish the plurality of real states from the input, each real state comprising an element of a real space;
encode the real states as a plurality of quantum objects, the quantum objects representing a correlithm object;
project the correlithm object to the real space using a measurement basis;
determine a plurality of measurement values corresponding to the measurement basis;
retrieve the projected correlithm object according to the measurement values; and
provide output indicating the projected correlithm object.

23. The logic of claim 22, wherein a quantum object of the plurality of quantum objects comprises an object selected from a group consisting of a quantum bit, a quantum register, and an ebit.

24. The logic of claim 22, operable to encode the real states as the quantum objects by assigning a plurality of values to the real states.

25. The logic of claim 22, operable to encode the real states as the quantum objects by adjusting a characteristic of a plurality of subatomic particles according to a distribution, each subatomic particle corresponding to a real state.

26. The logic of claim 22, wherein: each quantum object is associated with a probability; and
the measurement values are determined in accordance with the probabilities.

27. The logic of claim 22, operable to perform an intermediate operation prior to determining the plurality of measurement values corresponding to the measurement basis.

28. The logic of claim 22, operable to retrieve the projected correlithm object according to the measurement values by:
establishing a plurality of predicted values corresponding to the measurement basis;
comparing the measurement values with the predicted values using a metric; and
retrieving the projected correlithm object in accordance with the comparison.

29. A system for performing operations using quantum correlithm objects, comprising:
means for receiving input associated with a plurality of real states;
means for establishing the plurality of real states from the input, each real state comprising an element of a real space;
means for encoding the real states as a plurality of quantum objects, the quantum objects representing a correlithm object;
means for projecting the correlithm object to the real space using a measurement basis; means for determining a plurality of measurement values corresponding to the measurement basis;
means for retrieving the projected correlithm object according to the measurement values; and
means for providing output indicating the projected correlithm object.

30. A method for performing operations using quantum correlithm objects, comprising:
receiving input associated with a plurality of real states;
establishing the plurality of real states from the input, each real state comprising an element of a real space;
encoding the real states as a plurality of quantum objects by assigning a plurality of random values to the real states, and by adjusting a characteristic of a plurality of subatomic particles according to a distribution, each subatomic particle corresponding to a real state, the quantum objects representing a correlithm object, a quantum object of the plurality of quantum objects comprising an object selected from a group consisting of a quantum bit, a quantum register, and an ebit;
projecting the correlithm object to the real space using a measurement basis;
performing an intermediate operation prior to determining the plurality of measurement values corresponding to the measurement basis;
determining a plurality of measurement values corresponding to the measurement basis, each quantum object associated with a probability, and the measurement values determined in accordance with the probabilities; and
retrieving the projected correlithm object according to the measurement values by:
measurement values by:
establishing a plurality of predicted values corresponding to the measurement basis;
comparing the measurement values with the predicted values using a metric;
retrieving the projected correlithm object in accordance with the comparison; and
providing output indicating the projected correlithm object.

31. A method for performing operations using physical correlithm objects, comprising:
receiving; input associated with a plurality of real states;
establishing the plurality of real states from the input, each real state comprising an element of a real space;
encoding the real states as a plurality of physical objects, the physical objects representing a correlithm object;
projecting the correlithm object to the real space using a measurement basis;
determining a plurality of measurement values corresponding to the measurement basis; retrieving the projected correlithm object according to the measurement values: and providing output indicating the projected correlithm object.

32. The method of claim 31, wherein encoding the real states as the physical objects comprises assigning a plurality of values to the real states.

33. The method of claim 31, wherein:
each physical object is associated with a probability; and
the measurement values are determined in accordance with the probabilities.

34. The method of claim 31, wherein retrieving the projected correlithm object according to the measurement values comprises:
establishing a plurality of predicted values corresponding to the measurement basis;
comparing the measurement values with the predicted values using a metric; and
retrieving the projected correlithm object in accordance with the comparison.

35. A system for performing operations using physical correlithm objects, comprising:
a database operable to store data; and
a server system coupled to the database operable to:
establish a plurality of real states, each real state comprising an element of a real space; encode the real states as a plurality of physical objects, the physical objects representing a correlithm object;
project the correlithm object to the real space using a measurement basis;
determine a plurality of measurement values corresponding to the measurement basis; and
retrieve the projected correlithm object according to the measurement values.

36. The system of claim 35, the server system operable to encode the real states as the physical objects by assigning a plurality of values to the real states.

37. The system of claim 35, wherein:
each physical object is associated with a probability; and
the measurement values are determined in accordance with the probabilities.

38. The system of claim 35, the server system operable to retrieve the projected correlithm object according to the measurement values by:

establishing a plurality of predicted values corresponding to the measurement basis;
comparing the measurement values with the predicted values using a metric; and
retrieving the projected correlithm object in accordance with the comparison.

39. A logic for performing operations using physical correlithm objects, the logic encoded in a computer-readable storage medium and operable to:
receive input associated with a plurality of real states;
establish the plurality of real states from the input, each real state comprising an element of a real space;
encode the real states as a plurality of physical objects, the physical objects representing a correlithm object;
project the correlithm object to the real space using a measurement basis;
determine a plurality of measurement values corresponding to the measurement basis;
retrieve the projected correlithm object according to the measurement values; and
providing output indicating the projected correlithm object.

40. The logic of claim 39, operable to encode the real states as the physical objects by assigning a plurality of values to the real states.

41. The logic of claim 39, wherein:
each physical object is associated with a probability; and
the measurement values are determined in accordance with the probabilities.

42. The logic of claim 39, operable to retrieve the projected correlithm object according to the measurement values by:
establishing a plurality of predicted values corresponding to the measurement basis;
comparing the measurement values with the predicted values using a metric; and
retrieving the projected correlithm object in accordance with the comparison.

43. A system for performing operations using physical correlithm objects, comprising:
means for receiving input associated with a plurality of real states;
means for establishing the plurality of real states from the input, each real state comprising an element of a real space;
means for encoding the real states as a plurality of physical objects, the physical objects representing a correlithm object;
means for projecting the correlithm object to the real space using a measurement basis;
means for determining a plurality of measurement values corresponding to the measurement basis;
means for retrieving the projected correlithm object according to the measurement values; and
means for providing output indicating the projected correlithm object.

44. A method for performing operations using physical correlithm objects, comprising:
receiving input associated with a plurality of real states;
establishing the plurality of real states from the input, each real state comprising an element of a real space;
encoding the real states as a plurality of physical objects, the physical objects representing a correlithm object by assigning a plurality of values to the real states, each physical object associated with a probability;
projecting the correlithm object to the real space using a measurement basis;
determining a plurality of measurement values corresponding to the measurement basis, the measurement values determined in accordance with the probabilities; and
retrieving the projected correlithm object according to the measurement by:
establishing a plurality of predicted values corresponding to the measurement basis;
comparing the measurement values with the predicted values using a metric;
retrieving the projected correlithm object in accordance with the comparison; and
providing output indicating the projected correlithm object.

45. A system for calculating a tensor product, comprising:
a database operable to store data; and
a server system coupled to the database and operable to:
generate a first set of one or more first correlithm objects at a correlithm object generator, each first correlithm object representing a first orthonormal basis vector;
generate a second set of one or more correlithm objects at the correlithm object generator, each second correlithm object representing a second orthonormal basis vector;
perform a tensor operation on the first set and the second set to generate a tensor product of the first set and the second set, the tensor product comprising a plurality of third orthonormal basis vectors; and
provide output indicating the tensor product.

46. The system of claim 45, wherein the tensor product comprises a cardinal tensor product.

47. The system of claim 45, wherein:
the one or more first correlithm objects are organized as one or more first string correlithm objects;
the one or more second correlithm objects are organized as one or more second string correlithm objects; and
the tensor product comprises an ordinal tensor product.

48. Logic for calculating a tensor product, the logic encoded in a computer-readable storage medium and operable to:
generating a first set of one or more first correlithm objects at a correlithm object generator, each first correlithm object representing a first orthonormal basis vector;
generating a second set of one or more correlithm objects at the correlithm object generator, each second correlithm object representing a second orthonormal basis vector;
performing a tensor operation on the first set and the second set to generate a tensor product of the first set and the second set, the tensor product comprising a plurality of third orthonormal basis vectors; and
providing output indicating the tensor product.

49. The logic of claim 48, wherein the tensor product comprises a cardinal tensor product.

50. The logic of claim 48, wherein:
the one or more first correlithm objects are organized as one or more first string correlithm objects;
the one or more second correlithm objects are organized as one or more second string correlithm objects; and
the tensor product comprises an ordinal tensor product.

* * * * *